Feb. 26, 1963  G. MAY  3,079,001
MECHANICAL FILTER ASSEMBLY
Filed Oct. 8, 1958  2 Sheets-Sheet 1

INVENTOR.
Griffith May
BY
[attorneys' signatures]
att'y

Feb. 26, 1963  G. MAY  3,079,001
MECHANICAL FILTER ASSEMBLY
Filed Oct. 8, 1958  2 Sheets-Sheet 2

INVENTOR.
Griffith May
BY
Ezekiel Wolf, Wolf & Greenfield
atty

United States Patent Office 3,079,001
Patented Feb. 26, 1963

3,079,001
MECHANICAL FILTER ASSEMBLY
Griffith May, 112 Moffat Road, Newton, Mass.
Filed Oct. 8, 1958, Ser. No. 766,059
12 Claims. (Cl. 210—492)

This invention relates to mechanical filters and more particularly comprises a new and improved filter element for use in a stacked filter assembly. This invention is also closely related to the subject matter of my copending application entitled Mechanical Filter, Serial No. 751,662 filed July 29, 1958, now abandoned and may be considered a refined modification of the invention disclosed in that application.

In my copending application, supra, I disclose a composite filter element made of two identical filter components which are permanently secured together. Those composite elements are assembled in a stack with other identical elements and may be used to filter substantially all types of fluids. The filter element of the present invention broadly is the functional equivalent of one of those components. Unlike the prior invention, the filter element of the present invention is physically independent of other identical elements with which it is used in a stack. Nevertheless, this element has all of the advantages of the prior invention as well as many additional advantages.

Like the filtering medium of the elements disclosed in my copending application, the filtering medium of the present elements may be electrically insulated from the case in which they are assembled, so as not to collect electrostatically charged particles carried to the fluid being filtered. Moreover, the screens which constitute the filtering medium and the supports for the screens are formed as a unitary structure. The supports or frames of the elements bind the edges of the screens and prevent fraying. In addition to these common advantages, the present invention includes means for preventing relative rotative rotation of the several elements in the stack. In the prior art devices, the wear resulting from the rotation could occasionally cause filter and system failures of the most serious nature, particularly when the assemblies were used in aircraft.

The manner in which the elements of the present invention are fabricated insures complete uniformity of elements and virtually perfect mating of the several elements when they are arranged in a stack. In many of the prior art devices, the stacked components in the assembly were not perfectly mated and thus the seals formed between the elements by the application of pressure on the ends of the stack were not of a high order. Because the limitations of filtration are governed by the effectiveness of the seals, then use of the assembly was restricted.

Perhaps the most important advantage of this invention, particularly over the invention disclosed in my copending application, supra, is its ease of cleaning. When a stack of elements are disassembled, each side of the screen of each element is fully exposed and access readily may be had to the entire screen surface area.

Another important advantage of this invention is that it eliminates inventory problems. The sequence-stack-type filters now in use are made up of a plurality of different components such as screens, distinct inner and outer spacers, etc. Therefore, it has been necessary for the manufacturer to stock all of these elements in quantity and to make sure that the desired number of complete sets were available. With my invention, only one such element need be stored.

Another advantage of my filter elements is that when they are assembled in a stack, errors in stacking are readily detected by quick inspection. With the prior art devices, only careful inspection of the stack revealed improper sequence or position of the several components.

The several advantages described above are derived through the accomplishment of the following several objectives of my invention:

First, to provide a filter element which combines the filtering medium and the support in a unitary structure;

Second, to provide a filter element which is so designed that it may be used in combination with other identical filter elements to form a stack, thereby permitting each element in the stack to be made from the same die or mold;

Third, to provide filter elements which readily align or index in a predetermined relation both circumferentially and axially with identical filter elements when arranged in a stack;

Fourth, to provide a filter element which when used in combination with other identical filter elements forms an elastic or compressible stack;

Fifth, to provide a filter element which may readily be cleaned from either side of the screen, and which is free of all dirt collecting pockets or traps;

Sixth, to provide a filter element which when used in combination with other identical filter elements places all of the screens in tension, thereby enabling the screens to carry greater differential pressure loads with a minimum of support;

Seventh, to prevent fraying of the edges of the filter screens;

Eighth, to prevent relative rotation of the various filter elements in the stack;

Ninth, to distribute evenly over the inner and outer edges of the filter elements compressive loads applied to the stack; and Tenth, to provide a highly effective and resilient seal between the adjacent edges at the inner and outer diameters of the elements.

To accomplish these and other objects, my filter elements may each be made from a single mold or die within which is enclosed the filter screen. Each element is annular in shape and has inner and outer concentric rings in which are embedded the inner and outer edges of the screen. Ribs extend radially between the inner and outer rings on one side of the screen and form spacing members between adjacent screens when the elements are assembled in a stack with alternate elements inverted. Indexing seats are formed on the inner ring of each element between adjacent ribs, and these seats receive the ends of the ribs of one immediately adjacent element. Similar indexing seats are formed on the outer ring between spaced apart posts on that ring and receive the posts of the immediately adjacent element on that other side. As will be more fully appreciated from the following detailed description, these elements are particularly suited to be made by the injection, transfer or other pressure molding techniques. The screen is suspended within the cavity of the die and assumes the proper position in the finished element.

These and other objects and features of my invention along with its incident advantages will be better understood and appreciated from the following detailed description of several embodiments thereof, selected for purposes of illustration and shown in the accompanying drawings, in which.

The filter element shown in FIGURES 1–4 is but one of a number of such elements which make up a filter stack assembly. The size of these filter elements will of course vary from stack to stack to suit the particular application. The following description will first be confined to a detailed presentation of the element, and thereafter, the manner in which a number of such elements are assembled in a stack will be described.

The filter element 20 includes in its general organization an annular filtering medium 22 which may be a screen made of wire or cloth, or may be some other similar filter material. Rings 24 and 26 extend about the inner and outer edges of the annular screen 22 and a plurality of radial ribs 28 interconnect the rings. The ribs 28 form spacers and supports between adjacent filter elements and lend stiffness to each element. The rings and ribs molded about the screen actually enter the interstices of the filter material and are mechanically bonded to it by the keying action of the molded material and screen.

Figure 1:
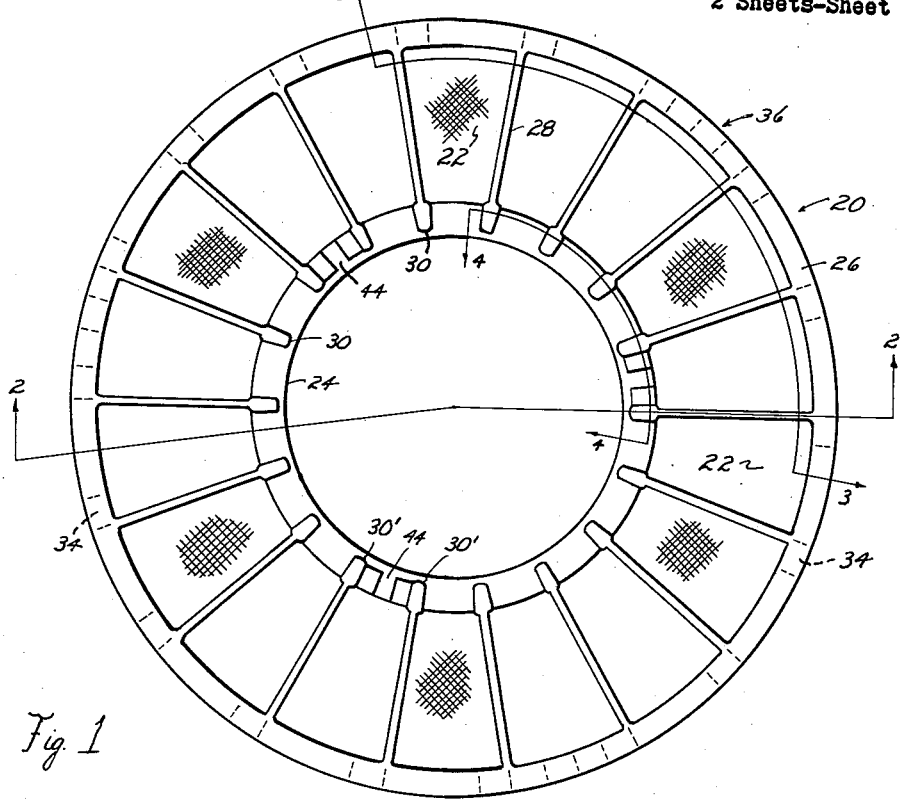
FIGURE 1 is a plan view of a filter element constructed in accordance with my invention.
Figure 2:
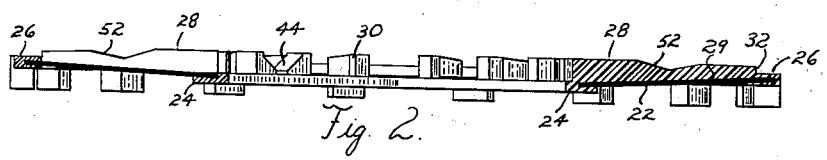
FIGURES 2, 3 and 4 are cross-sectional views taken along the corresponding section lines in FIGURE 1.

The ribs 28 integrally formed with the rings 24 and 26 are confined generally to what will be called for purposes of clarity, the upper surface or face 29 of the screen 22. The ribs are generally of uniform thickness as is shown in FIGURE 1, but have enlarged heads 30 formed at their inner ends above the ring 24. The height of each rib 28 gradually increases from the outer ring 26 to the inner ring 24 and their shorter ends form shoulders 32 at the inner edge of the outer ring 26.

Figure 3:
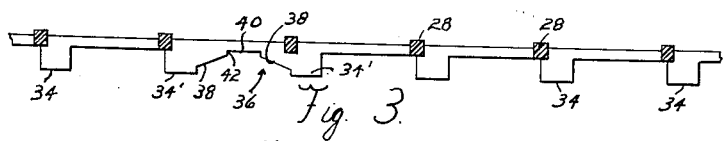

Posts 34 extending downwardly from the lower surface of the outer ring 26 form spacers between filter elements, disposed back to back in a stack. These posts 34 are adapted to engage the outer ring of the adjacent filter element as will be explained in detail below. Referring to FIGURE 3, the reader will note that indexing seats 36 are formed between a pair of such posts 34' that have adjacent sides which converge upwardly to a plane just below the bottom surface of the outer ring 26. The vertical walls 42 which extend upwardly from the tops of the inclined walls 38 define a shallow seat base 40 at the top of the key.

Figure 4:
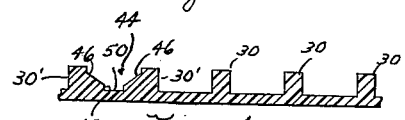

Similar indexing seats 44 are formed on the upper surface of the inner ring 24 between adjacent enlarged heads 30' at the inner ends of the ribs 28. In FIGURE 4 one of the indexing seats 44 is shown in detail. The seats 44 are defined by downwardly converging walls 46 which terminate a short distance above the upper surface of the ring 24, leaving opposed vertical walls 48 immediately above the base 50 of the seat.

The bases 40 and 50 of the indexing seats 36 and 44, respectively, are just wide enough to receive the posts 34 and the enlarged heads 30 formed on the inner ends of the ribs 28. Although any number of indexing seats 36 and 44 may be formed on the upper surface of the ring 24 and the lower surface of the ring 26, preferably three such seats are formed on each of the rings and are spaced equidistantly about the rings.

The molded spacers or supports are completed by shallow V-shaped notches 52 in the top of each of the ribs 28 intermediate their ends. These notches 52 provide communication between adjacent chambers defined by the ribs 28, as will be more fully explained when the filter stack is described.

As suggested in the introduction, the frame of the filter element may be made of plastic and molded by the injection or transfer molding technique. Alternatively, the frame may be made of metal. Each material has certain advantages and the particular application of the elements will determine the type of material to be used.

Regardless of the material selected, the inner and outer edges of the screen 22 should be embedded in the rings 24 and 26, thus making it impossible for the edges of the screen 22 to fray. If plastic is employed, it may be glass filled so as to be capable of withstanding the high temperatures that may be encountered. The plastic material would likely be appreciably lighter than most metallic materials which could be used while metal would provide greater strength and perhaps be capable of withstanding higher temperatures. Dimensional control is acquired with either type of material by virtue of the fact that the elements may be pressure molded.

Figure 5:
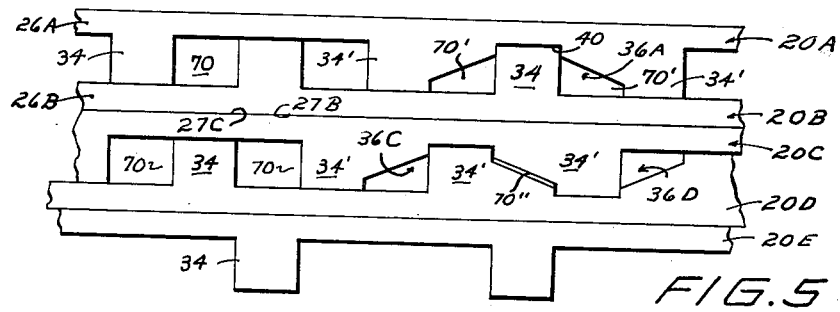
FIGURE 5 is a fragmentary elevation view in a curved plane of a number of filter elements assembled in a stack.

In FIGURES 5–8 I have shown a number of views of a stacked filter assembly composed of a plurality of elements. As shown in those figures, the filter elements are stacked alternately face to face and back to back, as alternate elements are inverted. That is, as is shown in FIGURE 5, the face of element 20A is directed upwardly while its back is disposed toward the back of inverted element 20B. It will be noted that the posts 34 and 34' on the outer ring 26A of element 20A extend downwardly in the stack. The ribs (not shown in FIGURE 5) of element 20A extend upwardly in the illustrated stack. The upper face 27C of the ring 26C of element 20C is flush with the upper face 27B of ring 26B of the element 20B. In FIGURE 5 I have also shown filter elements 20D and 20E. In the stack, elements 20B and 20D are inverted while the other elements are upright as in the position shown in FIGURES 1–4.

In FIG. 5, I have illustrated the manner in which the posts 34 interlock with the indexing seats 36. Attention is first directed to the two uppermost elements in the stack shown. It will be noted that the seat 36A of element 20A formed between the adjacent posts 34' receives the post 34 of element 20B and the top of the post 34 is locked between the vertical walls immediately adjacent the base 40 of the seat. When three such indexing seats are formed about the outer rings of the filter elements, there can be no relative displacement between back to back elements. The similar indexing seats 44 arranged about the inner ring of each element interlock adjacent elements disposed face to face in the stack. Thus, although I have not specifically illustrated interlocked ribs and indexing seats in the drawing, it should be understood that they appear just as the interlocked posts and seats in FIGURE 5, on a somewhat reduced scale, and prevent relative movement between face to face elements.

The indexing action provided by the seats 44 formed on the upper surface of the inner rings 24 is supplemented by the shoulders 32 formed at the outer ends of the ribs 28 adjacent the inner edge of the outer rings 26. The reader will note in FIGURE 7 that the ring 26A of element 20A rests on the upper face of the ring 26B of element 20B and engages the shoulders 32 on element 20B, and in a like manner the outer ring of element 20B engages the shoulders 32 formed at the outer ends of the ribs of element 20A. Because the rings engage the shoulders of the adjacent elements about the full circumference of the elements, relative translational movement between the two elements is prevented. The seats 44 formed on the inner rings 24 of the two elements 20A and 20B prevent relative rotational motion as well as translational motion between them.

Figure 6:
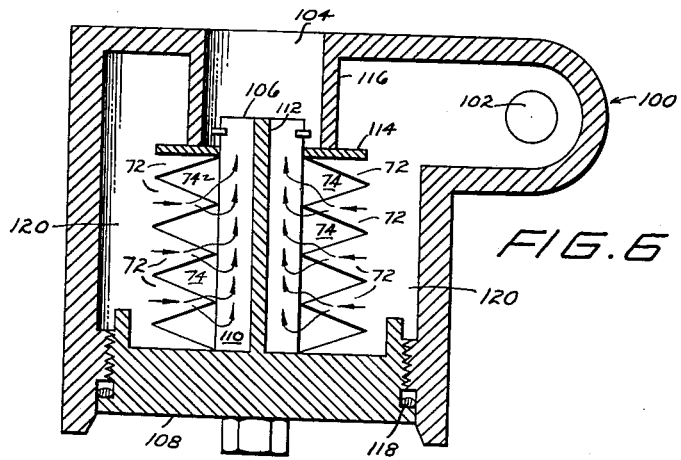
FIGURE 6 is a cross-sectional view of a housing within which are shown diagrammatically a stack of filter elements.
Figure 7:
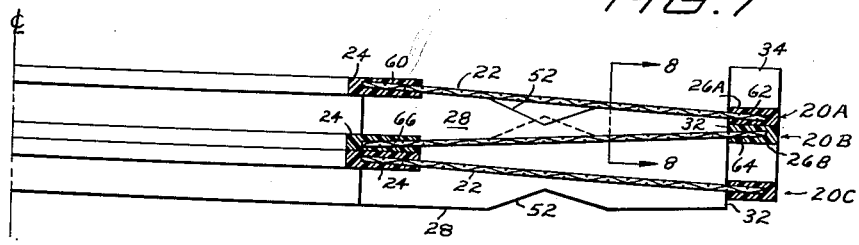
FIGURE 7 is a fragmentary cross-sectional view of a stack of filter elements.

It will be noted in FIG. 7 that the screen 22 of element 20A does not lie in a horizontal plane but rather is frusto-conical in shape. The inner edge 60 of the screen 22 of element 20A lies above the outer edge 62 of the screen. This is also true of screen 22 in element 20C. While the inverted elements 20A and 20C in FIGURE 7 have screens which extend upwardly at their center, the screen 22 of upright element 20B is higher at its outer edge 64 than at its inner edge 66. Thus, the screens in the stack define V-shaped passages which alternately open at the outer and inner diameters of the sequence. This arrangement is suggested in the diagrammatic representation of the filter elements in the stack of FIGURE 6. The apexes of the V-shaped passages are closed by the mating faces of the outer and inner rings. Specifically, the inner rings 24 of elements 20B and 20C close the apex of the V-shaped passage defined by the screens of those elements. Similarly, the outer rings 26A and 26B of elements 20A and 20B close the apex of the V-shaped passage defined between the screens of those elements.

The manner in which the elements perform their intended function becomes evident upon a viewing of FIGURE 6. In that figure I have shown diagrammatically several filter elements stacked in a housing 100 having an inlet 102 and an outlet 104. The elements 20 are assembled on a core 106 integrally formed with a plate 108 threaded into the open end of the housing 100. The core 106 is in the form of a spider having a pair of plates 110 and 112 arranged normal to and intersecting one another and each substantially the same width as the inner diameter of the filter elements. A disc 114 disposed on the top of the stack is engaged by a downwardly extending cylindrical collar 116 which forms part of the housing 100 and applies a compressive load on the stack. The load may be increased by screwing the plate 108 further into the housing. A gasket 118 disposed between the outer edge of the plate and the inner wall of the housing seals the bottom of the filter chamber while the skirt 116 forms a seal with the disc 114 at the other end of the stack. By applying a sufficient load on the stack, the outer rings 26 of the elements facing one another form seals at the apexes of the included V-shaped passages and similarly, the inner rings 24 of the elements disposed back to back form seals at the apexes of the enclosed V-shaped passages.

When the elements are arranged in a stack as shown, the liquid to be filtered is directed through the inlet 102 into the annular space 120 about the stack of filter elements. The posts 34 arranged about the periphery of the outer rings serve to separate the outer edges of the elements which are oriented back to back and define openings 70 which communicate with the annular space. Because the apexes of the V-shaped passages between those elements are sealed by the joining of the inner rings 24, the liquid to reach the central column about the core 106 must flow through the screens into the adjacent V-shaped passages which are open at the core. The V-shaped passages which communicate with the openings 70 are identified by numeral 72 in FIGURE 6 while the outlet V-shaped passages open at the center of the stack are identified by numeral 74. Thus, the liquid which enters the V-shaped passages 72 divides generally into two streams as suggested by the arrows in FIGURE 6 and enters the adjacent outlet passages 74. The inner ends of the outlet passages 74 are separated by the enlarged head 30 of the ribs 28.

It will be noted that the ribs 28 subdivide each V-shaped outlet passage 74 about the annulus into a plurality of subpassages defined at the top and bottom by the screens 22 of adjacent elements and by ribs on each side. The ribs on each side are part of different filter elements. Because the indexing seats 44 on the inner rings are equidistant from the heads of the adjacent ribs, the ribs of one element bisect the space between the ribs of the facing mating element. Thus, the subpassages are all of the same circumferential width. These subpassages communicate with one another by virtue of the V-shaped notches 52 formed in each of the ribs 28. This intercommunication of the distinct subpassages is provided for a number of reasons. First, they permit equal pressure distribution about the entire annulus by permitting free flow between subpassages in the same plane in the stack. In addition, they prevent breakdown of the system which otherwise would occur if one of the outlets between the enlarged heads 30 of the ribs became blocked. Attention is called to the passages in key 36A between posts 34 and 34' and identified by numerals 70' in FIG. 5. It will be noted that these passages are partially obstructed by the inclined walls which define the sides of the indexing seat. This restriction is duplicated at the inner rings 24 by indexing seats 44 and the enlarged heads 30 of the ribs. A somewhat more pronounced condition exists when two indexing seats are mated on opposing rings. For example, in FIG. 5, the seats 36C and 36D formed on the outer rings of the filter elements 20C and 20D are shown in registration. The indexing seats are intentionally designed so that this may occur. That is, a post 34' formed on one side of a seat may mate with a seat in the adjacent filter element. When the elements are stacked in that manner it will be noted that a very small opening 70" is formed between interengaging posts 34'. It will be appreciated that similar restricted openings are formed at the inner rings between face to face elements when seats 44 are mated. When this occurs, the liquid which passes through the screens into the subpassage in front of the opening similar to opening 70" passes at least in part into the adjacent subpassages through the notches 52, and out their unrestricted openings into the center of the stack.

Figure 8:
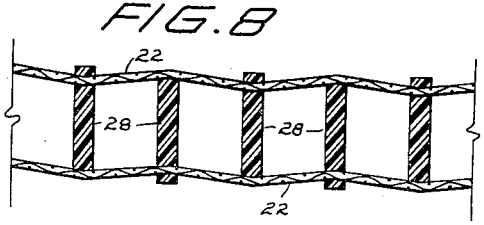
FIGURE 8 is a cross-sectional view taken along the section line 8—8 in FIGURE 7.

Having described in detail the physical characteristics of each of the filter elements and further suggested the manner in which they are arranged in a stack, I will now describe some of the more subtle of their features which are not readily apparent upon an inspection of the drawing. It is known to those skilled in the art that filter elements of the general type disclosed in this application are capable of sustaining greater fluid pressure when the filter screens are under tension. In FIGS. 7 and 8 I have illustrated the manner in which this condition is achieved. For clarity FIG. 8 is somewhat exaggerated. When a pair of elements are placed face to face and the outer rings 26 are held together and the enlarged heads 30 lie against the surface of the inner ring 24 of the adjacent element, an interference fit exists between the ribs of one element and the screen of the adjacent element. Thus, the ribs of one element stretch the screen of the adjacent element to give the screen somewhat of a scalloped cross section as shown in FIGURE 8. By introducing this tension into the screen, the element is capable of withstanding greater pressure drop.

Another advantage of my invention not readily apparent from an inspection of the drawing is derived from the staggered arrangement of the posts 34 as shown in FIG. 5. Rather than being aligned vertically from element to element, the posts are arranged in transverse rows about the periphery of the stack. This introduces an elastic effect into the column which will allow the outer rings 26 of each element to scallop when the stack is axially compressed. It is possible to form a better seal between the adjacent rings by virtue of this feature and even more important, considerable dimensional tolerance is lent to the housing for the stack. The staggered posts distribute compressive loads applied to the ends of the stack equally about the periphery of the elements rather than concentrate the loads at spaced points about the stack periphery as would be the case if the posts on each ring were vertically aligned. The posts 34 about the outer ring of the element illustrated are one-third the circumferential width of the space between adjacent posts. Two filter elements mated back to back have posts about the periphery spaced apart a distance equal to the width of the posts. The posts of a third filter element stacked with the two mated elements are aligned vertically with every other space between the posts of the mated elements. The posts of a fourth element added to the stack will align themselves with the other spaces between the posts of the originally mated elements. This arrangement is clearly illustrated in FIGURE 5. It should be noted that the same relationship exists between the enlarged heads 30 at the inner edge of the stack.

From the foregoing description, it is clear that I have provided a filter element which may be used as part of a stack with other elements of identical configuration. It is only necessary that alternate elements be inverted so that they lie face to face and back to back in sequence. No care need be taken to mate various radial sectors when the stack is assembled. The elements automatically align with slight twisting of the stack because the inclined surfaces which converge at the base of each indexing seat formed about the inner and outer rings direct the elements into the desired alignment. Once indexed or aligned and compressively loaded, the vertical walls at the sides of the seats and the shoulders 32 prevent any relative displacement of the elements.

Because the inner and outer edges of the filter screen are buried in the rings 24 and 26, no fraying may occur nor can a piece of the screen break from the element. When the elements are assembled, there are no crevises or pockets in the stack which can collect dirt.

When plastic is employed as the frame material another advantage is acquired. Unlike metallic rings, rings made of a plastic material electrically insulate the screens from the grounded case. As a result, metallic wire filter cloths do not assume an electrical characteristic which is different from that of the material which is carried in the liquid to be filtered. Therefore, electrostatic adherence of small particles is prevented.

Another important advantage of my invention is that all of the filter elements in the stack may be made from a single mold or die. Because the elements may be made in one die or mold, complete dimensional control may be acquired.

It may also be noted that the inner ends of the ribs terminate short of the inner edge of the inner rings 24. This permits the use of a perforated cylindrical core which engages the inner edges of the inner rings to support the stack. Because the inner ends of the ribs do not extend inwardly to the inner edge of the stack, solid portions of the core cannot form dead ends at the discharge ends of the subpassage.

Having described in detail one embodiment of my invention, it will be appreciated that numerous modifications may be made of that embodiment without departing from the spirit of the invention. For example, the elements illustrated are designed for use in a stack with outside-inside flow. That is, the liquid to be filtered flows from the outside of the stack through the elements to the central column. The elements may readily be modified for use in inside-outside flow patterns. Consider the portion of the stack illustrated in FIGURE 7. If the elements were modified so that the center line of the stack was disposed on the right side of the section, the stack would be suitable for use in a reverse flow system. It should also be appreciated that two elements oriented face to face may be sealed together about their inner and outer edges wherever rings, ribs and heads engage the mated element. By this simple act, the pairs of discs may be converted into composite elements.

Figure 9:
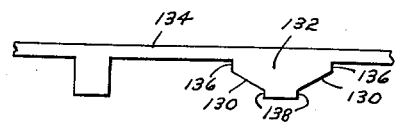
FIGURE 9 is a fragmentary side view of a modification of my invention.

It should also be appreciated that the indexing or self aligning features of the elements may be achieved by means of other geometric shapes of seats. One such alternative shape is shown in FIGURE 9, a view of a filter element similar to the view of FIGURE 3. In this modification, the seats 36 are replaced by inclined walls 130 extending from adjacent the bottom of each post, upwardly to the lower surface of the outer rim 134. The horizontal distance of each inclined wall should equal the width of the post 132 and the space between posts should be three times the post width to achieve the same post spacing as shown in FIGURE 5. The short vertical walls 136 on the top of the inclined walls define the seat for the mating post of the adjacent element, while vertical walls 138 at the bottom of the inclined walls 130 form square corners at the ends of the post to engage the seat.

The reader would also appreciate that the elements need not be confined to the annular shape illustrated and described, and virtually any configuration may be adopted. In some applications of my invention it may be desirable to make the perimeter of the elements in the shape of a polygon or oval with the central opening either the same or some other shape. In view of the many possible variations which may be made of my invention, I do not intende to limit its scope to the specific embodiments illustrated and described. Rather, it is my intention that the breadth of this invention be determined by the appended claims and their equivalents.

What I claim as new and desire to secure by Letters Patent of the United States is:

1. A filter element comprising an annular screen, a ring secured to the outer periphery of the screen, a second ring secured to the inner edge of the screen, a plurality of ribs extending radially from the inner to the outer ring and secured to the upper side of the screen, enlarged heads formed on the inner end of each of the ribs and secured to the upper surface of the inner ring, a plurality of indexing seats formed on the upper surface of the inner ring between selected pairs of heads and spaced about the inner ring, said indexing seats being adapted to receive the enlarged heads of an inverted identical filter element disposed immediately above it to displace circumferentially the ribs of said identical element with respect to the ribs of said filter element, spaced apart posts formed on the outer ring and extending downwardly from the lower surface of the outer ring, additional indexing seats formed on the lower surface of the outer ring intermediate selected pairs of said posts and spaced about the outer ring, said additional indexing seats being adapted to receive posts of an inverted identical filter element disposed below it, said indexing seats and additional indexing seats preventing relative translational and rotational movement of said filter element with respect to the inverted elements, and notches formed in the upper edge of each of the ribs intermediate their ends.

2. A filter element as defined in claim 1 further characterized by said ribs gradually increasing in height from their outer to their inner ends, and the outer ends of the ribs terminating at the inner edge of the outer ring and forming shoulders adapted to engage the inner edge of the outer ring of the inverted element disposed on its upper surface said shoulders cooperating with said indexing seats and additional indexing seats to prevent relative translational and rotational movement of said filter element with respect to the inverted elements.

3. A filter stack comprising a plurality of identical filter elements alternately inverted in the stack so as to be arranged in the stack back to back and face to face, each of said elements including an annular screen, inner and outer rings secured to the inner and outer edges of the screen, radial ribs secured to the face of each screen and extending between the inner and the outer rings, each of said ribs abutting against the face of the screen of the adjacent filter element disposed face to face with it and forming sector-shaped channels between the face to face elements in the stack, indexing means formed on the face of the inner ring between the inner ends of selected ribs, said indexing means receiving the inner ends of ribs of the filter element facing it for positioning the ribs of the face to face elements in a preselected circumferentially displaced relationship and preventing relative translational and rotational movement of said face to face elements, shoulders formed at the outer end of each of the ribs and engaging the outer ring of the filter element disposed in face to face relationship with it, said shoulders co-operating with the indexing means for preventing relative translational movement of the face to face elements, posts on the back of the outer ring and spaced about the ring, the posts engaging and separating the outer rings of filter elements disposed back to back in the stack, additional indexing means formed between selected posts on the outer rings and receiving the posts of the adjacent filter elements, said additional indexing means positioning the posts of the back to back elements in a preselected circumferential relationship and preventing relative rotational and translational movement of the elements disposed back to back, and openings formed in the ribs providing communication between each of the sector shaped channels.

4. A filter element comprising inner and outer coaxial rings made of electrically insulating material, an annular screen having its edges embedded in the rings, spaced apart ribs extending from one side of the screen and disposed radially between the inner and outer rings, said ribs increasing in height from one of the rings to the other, posts formed on the ring at the shorter ends of the ribs on the other side of the screen, posts formed on the other ring on the said one side of the screen, and means formed on the rings and mateable with posts on the inner and outer rings of identical filter elements for positioning said element in a preselected circumferentially displaced relationship with identical filter elements disposed on each side of said element.

5. A filter stack comprising a pair of coaxial filter elements disposed one beside the other, each of said elements having an annular screen and rings secured to the inner and outer edges of each screen, means sealing the outer rings of the pair of elements, ribs secured to and extending outwardly from the adjacent faces of each screen and abutting against and supporting the adjacent face of the other screen, said ribs increasing in height from the outer to the inner rings and separating the inner rings of the elements, and aligning means formed on the rings urging the ribs of one screen to lie between the ribs of the other screen in a preselected relationship, said sealing means preventing access between the outer rings to the space between the screens.

6. A device as defined in claim 5 further characterized by additional filter elements identical to and disposed one on each side of the pair of elements, the ribs of said additional elements facing away from the pairs of elements, means formed on the outer rings of the elements separating the outer rings of the additional elements from the outer rings of the pair of elements, and means sealing the inner rings of said additional elements against the adjacent inner rings of said pair of elements, said last-named means preventing access to the center of the annulus between the sealed inner rings.

7. A device as defined in claim 6 further characterized by means formed on the outer rings of the elements urging the ribs of one of the additional elements to lie in planes between alternate pairs of the ribs in the assembled pair of elements and the ribs of the other additional element to lie in planes between the other pairs of the ribs in the assembled pair of elements.

8. A filter stack comprising a pair of coaxial filter elements disposed one beside the other, each of said elements having an annular screen and rings secured to the inner and outer edges of the screen, a plurality of ribs secured to the facing surfaces of the screens and abutting the facing surface of the other screen in an interference fit to place the screens in tension, the ribs on each screen being disposed radially on and equidistantly spaced about the screens, keys formed on adjacent rings of the filter elements causing the ribs of one element to bisect the space between the ribs on the other element whereby the ribs form a plurality of quadrant-shaped passages of equal size between the screens.

9. A filter assembly comprising a plurality of coaxially aligned identical filter elements alternately inverted in sequence to form pairs of face to face and back to back elements, each of said elements including an annular filter screen having its inner and outer edges embedded respectively in inner and outer rings, supports secured to the face of each screen and abutting against the face of the screen of the facing element for tensioning the screen of said facing element, and means formed on the rings of the elements positioning and retaining the supports of the elements of each face to face pair in a preselected circumferentially displaced relationship.

10. A filter assembly comprising a pair of coaxial filter elements disposed one beside the other, each of said elements having an annular screen and rings secured to the inner and outer edges of each screen, ribs secured to and extending outwardly from the adjacent faces of each screen and abutting against and supporting the adjacent face of the other screen, said ribs placing said screens in tension, said ribs increasing in height from the rings at one edge to the rings at the other edge and separating the rings at said other edge, and means sealing the rings of the pair of elements at the one edge together preventing access between the rings at said one edge to the space between the screens and positioning the ribs of one screen between the ribs of the other screen.

11. A filter stack comprising a pair of coaxial filter elements disposed one beside the other, each of said elements having an annular screen and rings secured to the inner and outer edges of the screen, a plurality of ribs secured to the facing surfaces of the screens and abutting the facing surfaces of the other screens to place the screens in tension, the ribs on each screen being disposed radially about the screen, indexing means formed on adjacent rings of the elements causing the ribs of one element to lie between the ribs on the other element whereby the ribs form a plurality of quadrant-shaped passages between the screens.

12. A filter assembly comprising a plurality of coaxially aligned identical filter elements alternately inverted in sequence to form pairs of face to face and back to back elements, each of said elements including an annular filter screen having its inner and outer edges embedded respectively in inner and outer rings, supports secured to the face of each screen and abutting against the face of the screen of the facing element for tensioning the screen of said facing element, and means formed on the elements for retaining the supports of the elements of each face to face pair in a preselected circumferentially displaced relationship.

References Cited in the file of this patent

UNITED STATES PATENTS

| | | |
|---|---|---|
| 984,704 | Rarick | Feb. 21, 1911 |
| 2,088,199 | Gleason | July 27, 1937 |
| 2,143,270 | Huber | Jan. 10, 1939 |
| 2,153,664 | Freedlander | Apr. 11, 1939 |
| 2,444,147 | Walton | June 29, 1948 |
| 2,654,440 | Robinson | Oct. 6, 1953 |
| 2,696,914 | Conley | Dec. 14, 1954 |
| 2,836,302 | Buckman | May 27, 1958 |

FOREIGN PATENTS

| | | |
|---|---|---|
| 722,472 | Great Britain | Jan. 26, 1955 |
| 204,640 | Australia | Nov. 21, 1956 |
| 1,140,981 | France | Aug. 22, 1957 |